(12) United States Patent
Miyata et al.

(10) Patent No.: US 9,886,973 B2
(45) Date of Patent: Feb. 6, 2018

(54) SURFACE TREATMENT OF MAGNETIC RECORDING HEADS FOR IMPROVING THE ROBUSTNESS THEREOF

(71) Applicant: HGST Netherlands B.V., Amsterdam (NL)

(72) Inventors: Kazuhito Miyata, Fujisawa (JP); Cherngye Hwang, San Jose, CA (US); Takefumi Kubota, Yokohama (JP); Mineaki Kodama, Ashigarakamigun Kaiseimachi (JP); Dorcas Gazelle Lagasca Flavier, Binan (PH); Mary Agnes G. Perez, Paranaque (PH); Eduardo Torres Mireles, San Jose, CA (US); Marlon Estrella Tecson, Dasmarinas (PH)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/199,781

(22) Filed: Jun. 30, 2016

(65) Prior Publication Data
US 2018/0005649 A1   Jan. 4, 2018

(51) Int. Cl.
*G11B 5/127* (2006.01)
*H04R 31/00* (2006.01)
(Continued)

(52) U.S. Cl.
CPC .......... *G11B 5/3169* (2013.01); *G11B 5/1278* (2013.01); *G11B 5/314* (2013.01); *G11B 5/40* (2013.01)

(58) Field of Classification Search
CPC ..... G11B 5/1276; G11B 5/1278; G11B 5/314; G11B 5/3153; G11B 5/3163; G11B 5/3169; G11B 5/40; G11B 5/855
See application file for complete search history.

(56) References Cited

U.S. PATENT DOCUMENTS 5,323,282 A * 6/1994 Kanai ................. G11B 5/6005
                                                   360/235.3
5,838,522 A * 11/1998 Komvopoulos .... C04B 41/0027
                                                   360/122

(Continued)

OTHER PUBLICATIONS

IP.com, "magnetic head," IPCOM000224827D, Jan. 8, 2013, pp. 1-4.
IP.com, "Method in Tailoring ABS Roughness for Improved Slider Flyability,"IPCOM000124906D, May 11, 2005, pp. 1-7.

*Primary Examiner* — Paul D Kim
(74) *Attorney, Agent, or Firm* — Foley & Lardner LLP

(57) ABSTRACT

In one embodiment, a method includes forming a structure having a first region including a ceramic material, a second region including a plurality of particles disposed in a ceramic matrix material, and a magnetic head assembly disposed in the first region. The method also includes directing a first ion beam at a side of the first and second regions of the structure, the first ion beam including an oxidizing species to oxidize one or more portions of the particles located near the side of the second region, where the one or more oxidized portions of the particles protrude from the side of the ceramic matrix material of the second region. The method further includes directing a second ion beam at the side of the first and second regions of the structure, the second ion beam including an inert species to recess the first and second regions.

18 Claims, 9 Drawing Sheets

(51) Int. Cl.
*G11B 5/31* (2006.01)
*G11B 5/40* (2006.01)

(56) References Cited

U.S. PATENT DOCUMENTS

| | | | |
|---|---|---|---|
| 5,943,187 A | 8/1999 | Chen et al. | |
| 6,238,582 B1* | 5/2001 | Williams | C23F 4/00 |
| | | | 216/22 |
| 6,249,403 B1* | 6/2001 | Tokisue | G11B 5/10 |
| | | | 360/235.2 |
| 6,368,425 B1 | 4/2002 | Segar et al. | |
| 6,647,612 B1 | 11/2003 | Boutaghou et al. | |
| 7,948,712 B2 | 5/2011 | Martin | |
| 7,961,427 B2 | 6/2011 | Dorbeck et al. | |
| 8,139,309 B2 | 3/2012 | Knigge et al. | |
| 8,760,804 B2* | 6/2014 | Brinkman | G11B 5/3116 |
| | | | 360/110 |
| 8,947,826 B2 | 2/2015 | Bhatia et al. | |
| 2009/0073610 A1* | 3/2009 | Ohtani | G11B 5/6005 |
| | | | 360/234.3 |
| 2011/0007423 A1 | 1/2011 | Dong et al. | |

* cited by examiner

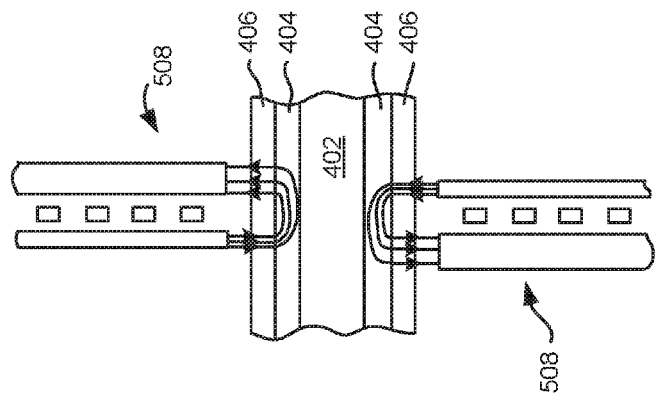
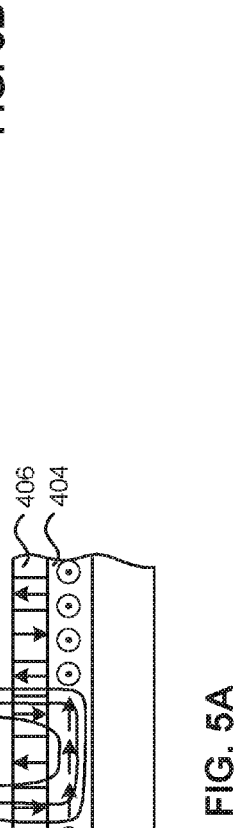
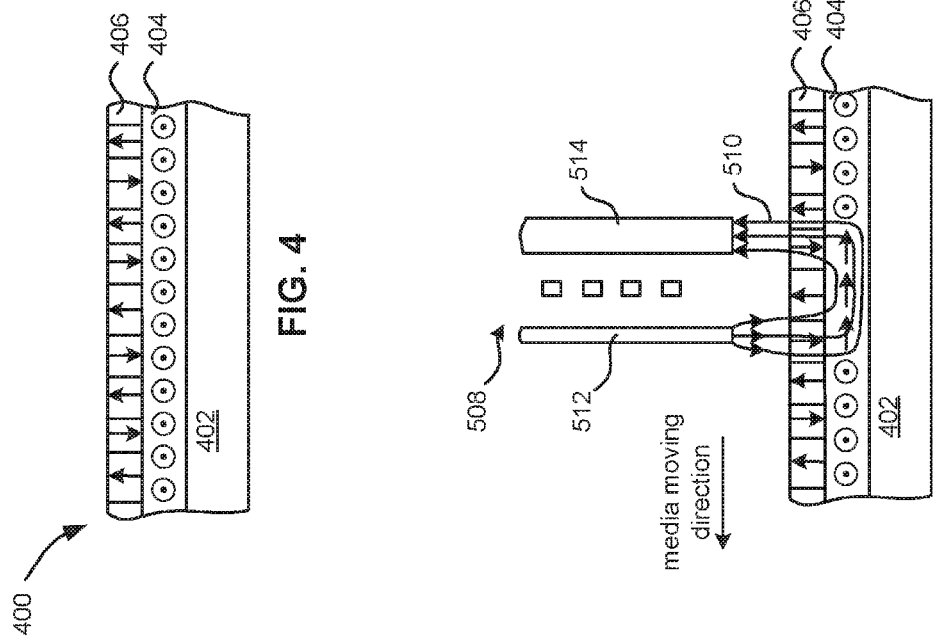

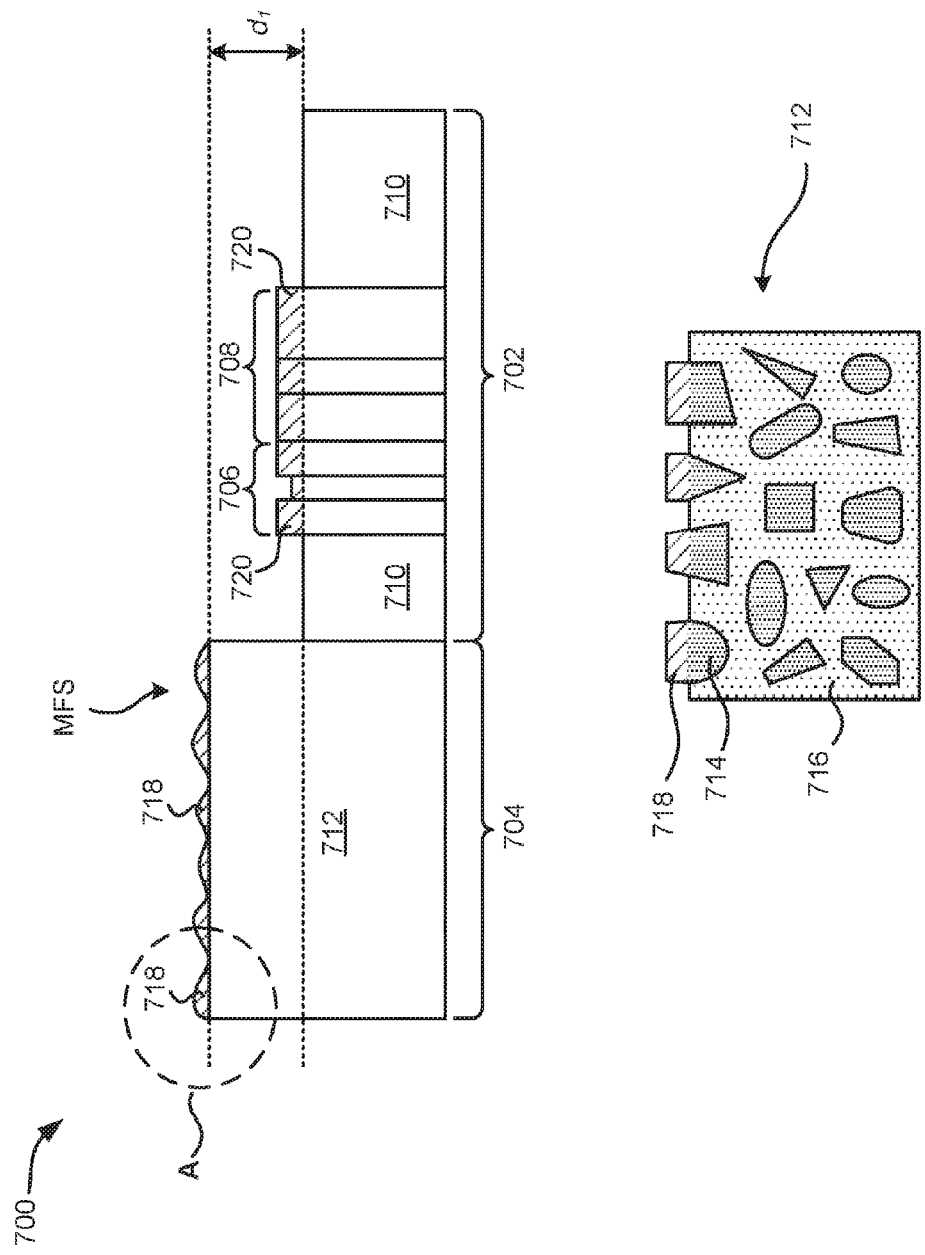

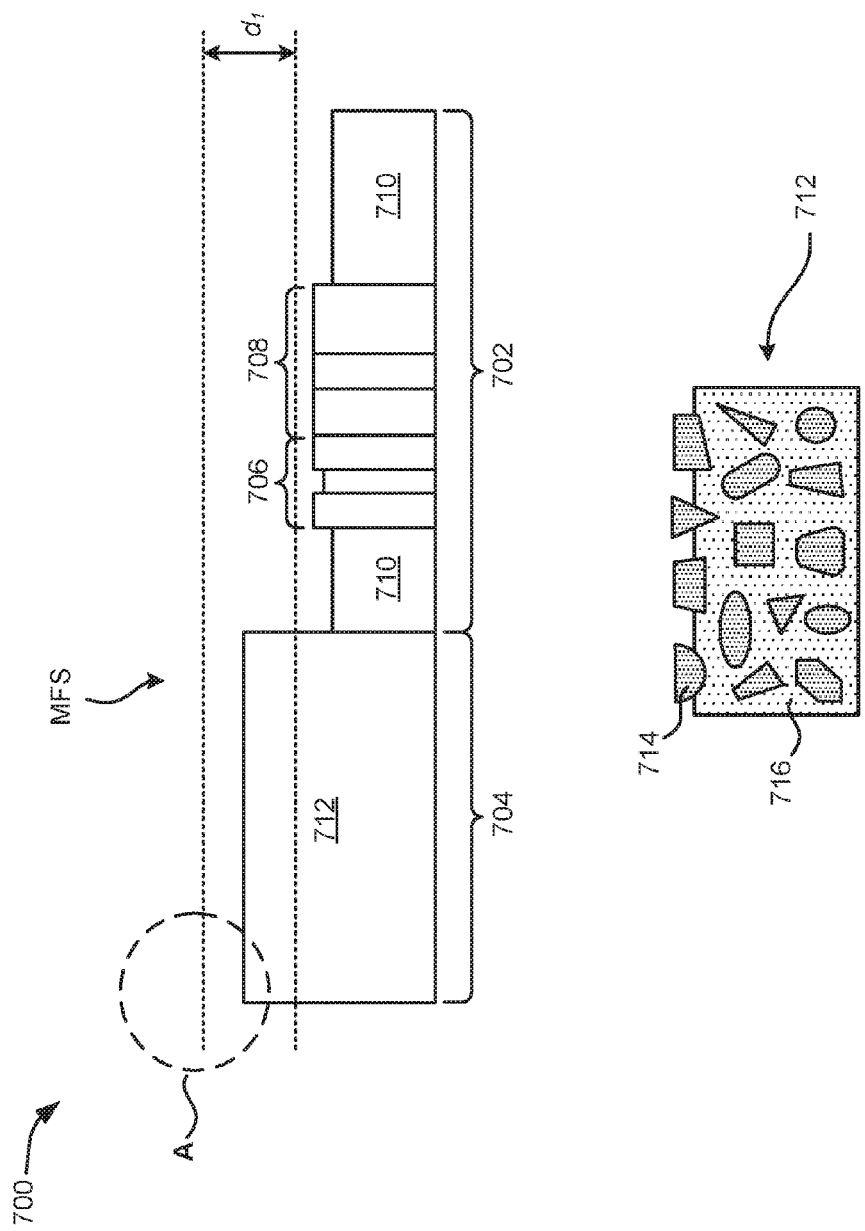

SURFACE TREATMENT OF MAGNETIC RECORDING HEADS FOR IMPROVING THE ROBUSTNESS THEREOF

FIELD OF THE INVENTION

The present invention relates to data storage systems, and more particularly, this invention relates to a surface treatment of magnetic recording heads for improving the robustness thereof.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent the media facing side (MFS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to meet this desire is to increase the capacity by increasing the recording density of the HDD. To achieve higher recording density, further miniaturization of recording bits is effective, which in turn typically requires the design of smaller and smaller components. This reduction in component size is aided by the ability to maintain the reading and writing elements in a magnetic head in a position closer to the magnetic recording layer of the magnetic medium. This distance between the reading and writing elements and the magnetic recording layer is referred to as the magnetic spacing.

Narrowing the magnetic spacing is a very effective method for improving the recording density of a magnetic recording device, such as a HDD. Reducing the clearance, which is defined as the gap between the lowest point (farthest protruding portion at the MFS) of the magnetic head and the uppermost surface of the magnetic medium has been attempted to reduce the magnetic spacing. A technique used in magnetic recording devices to reduce this clearance relies on thermal expansion of one or more portions of the magnetic head. This thermal expansion is caused by a heater which is positioned near one or more elements of the magnetic head such that applying current to this heater controls the expansion of the one or more portions of the magnetic head to provide a smaller head-to-medium clearance.

However, a smaller clearance may also lead to undesirable interactions between the magnetic head and the adjacent magnetic disk. Such interactions may lead to damage of both the magnetic head and disk surfaces. While advancements have been made to developing thin film lubricant layers for disk surfaces, there remain several challenges for fabricating protective coatings for head surfaces. For instance, one such challenge involves ensuring proper adhesion of the protective coating to head surfaces in view of the intermittent contact between the magnetic head and disk. Accordingly, there is a need in the art for the development of durable thin protective coatings for magnetic head surfaces.

SUMMARY

According to one embodiment, a method includes forming a structure having a first region including a ceramic material, a second region including a plurality of particles disposed in a ceramic matrix material, and a magnetic head assembly disposed in the first region. The method also includes directing a first ion beam at a side of the first and second regions of the structure, where the first ion beam includes an oxidizing species to oxidize one or more portions of the particles located near the side of the second region, and where the one or more oxidized portions of the particles protrude from the side of the ceramic matrix material of the second region. The method further includes directing a second ion beam at the side of the first and second regions of the structure, where the second ion beam includes an inert species to recess the first region and the second region a predetermined amount.

According to another embodiment, a structure includes a first region including an oxide ceramic material, a second region including a plurality of non-oxide particles disposed in an oxide ceramic matrix material, and a magnetic head assembly disposed within the first region, where the structure has physical characteristics of being formed using an ion beam etching process that requires an ion beam having an inert species and an oxidizing species therein, one of the physical characteristics including a surface roughness in a range from about 0.5 to about 0.7 nm.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a schematic representation of a perpendicular recording medium, according to one embodiment.

FIG. 5A is a schematic representation of a recording head and the perpendicular recording medium of FIG. 4, according to one embodiment.

FIG. 5B is a schematic representation of a recording apparatus configured to record separately on both sides of a perpendicular recording medium, according to one embodiment.

FIGS. 7A-7C provide a simplified representation of a portion of a magnetic head slider in various stages of formation in order to illustrate a surface treatment configured to improve head wear robustness, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method includes forming a structure having a first region including a ceramic material, a second region including a plurality of particles disposed in a ceramic matrix material, and a magnetic head assembly disposed in the first region. The method also includes directing a first ion beam at a side of the first and second regions of the structure, where the first ion beam includes an oxidizing species to oxidize one or more portions of the particles located near the side of the second region, and where the one or more oxidized portions of the particles protrude from the side of the ceramic matrix material of the second region. The method further includes directing a second ion beam at the side of the first and second regions of the structure, where the second ion beam includes an inert species to recess the first region and the second region a predetermined amount.

In another general embodiment, a structure includes a first region including an oxide ceramic material, a second region including a plurality of non-oxide particles disposed in an oxide ceramic matrix material, and a magnetic head assembly disposed within the first region, where the structure has physical characteristics of being formed using an ion beam etching process that requires an ion beam having an inert species and an oxidizing species therein, one of the physical characteristics including a surface roughness in a range from about 0.5 to about 0.7 nm.

Figure 1:
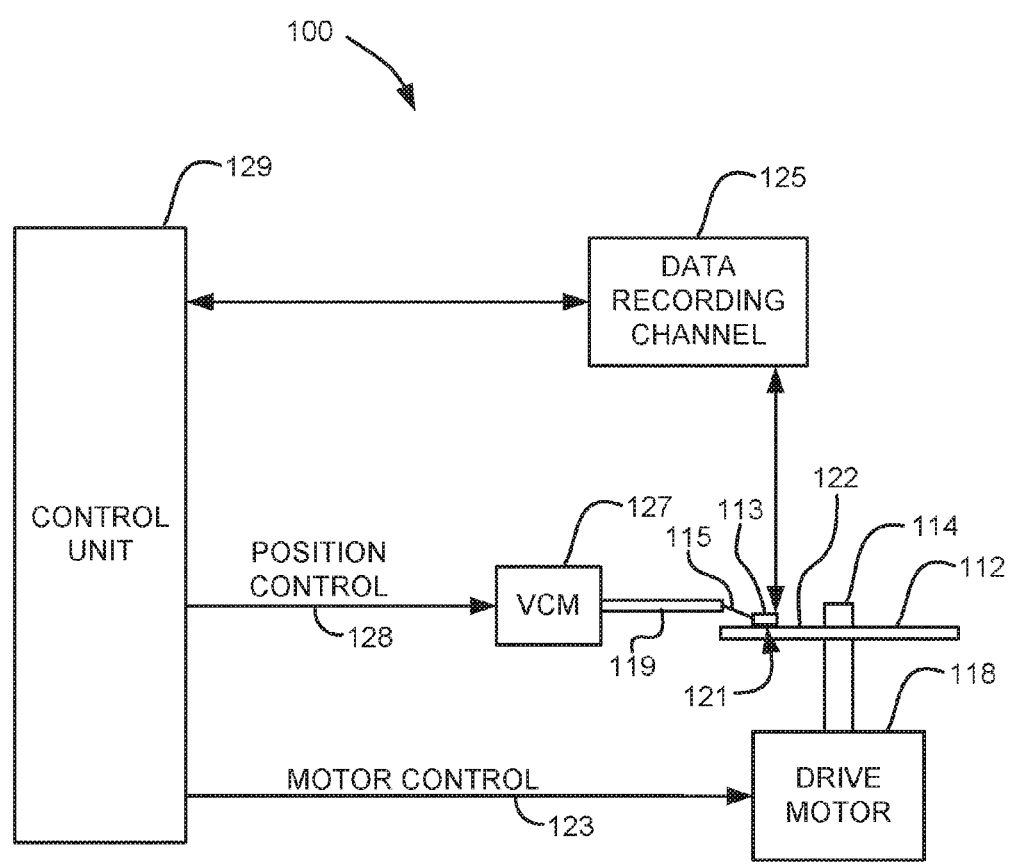
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
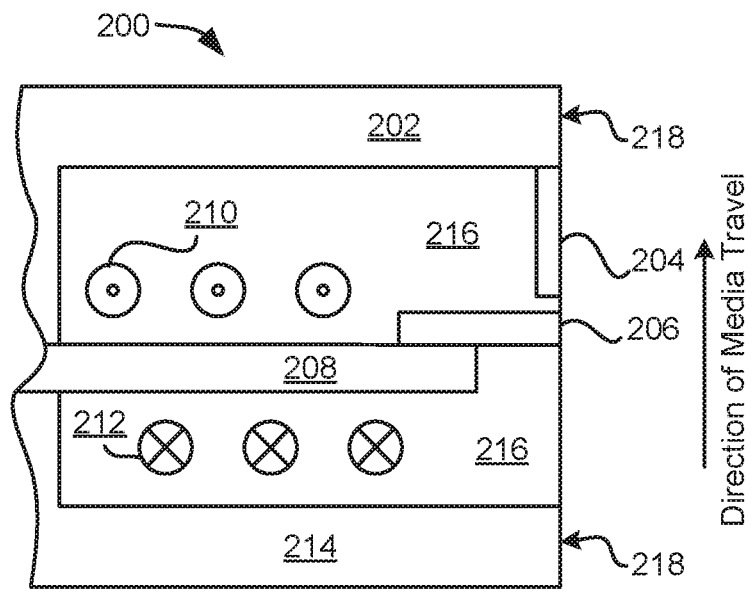
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
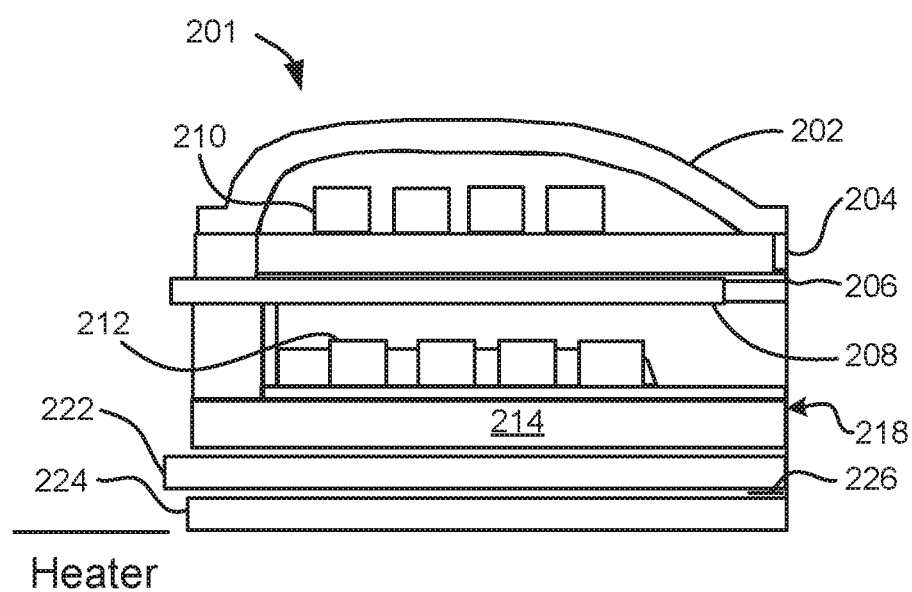
FIG. 2B is a cross-sectional view of a piggyback magnetic head with helical coils, according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
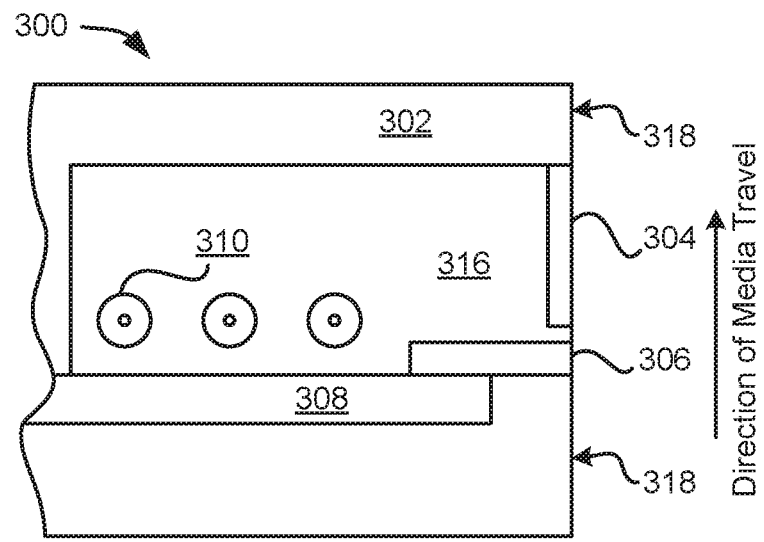
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
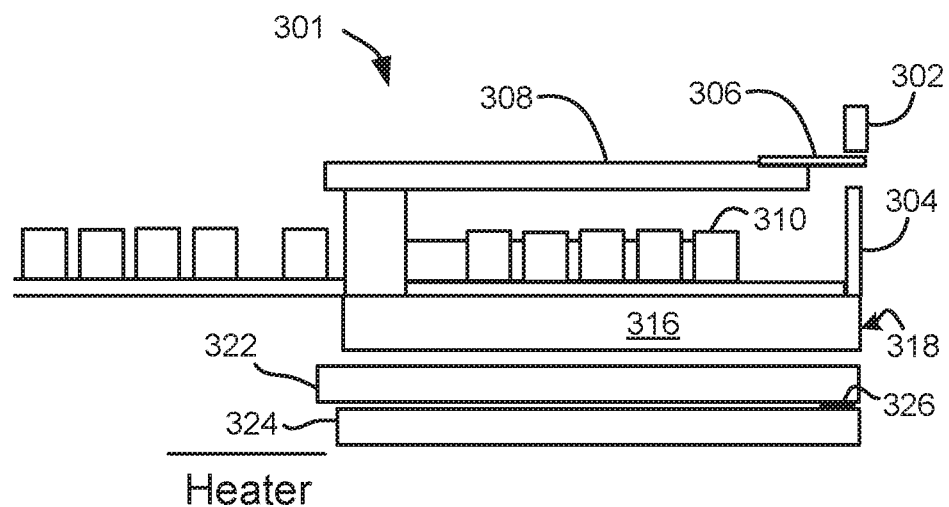
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft magnetic underlayer 404. As particularly shown in FIG. 4, the in-plane magnetization of the soft magnetic underlayer 404 may be represented by an arrow extending into the paper.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

Figure 6:
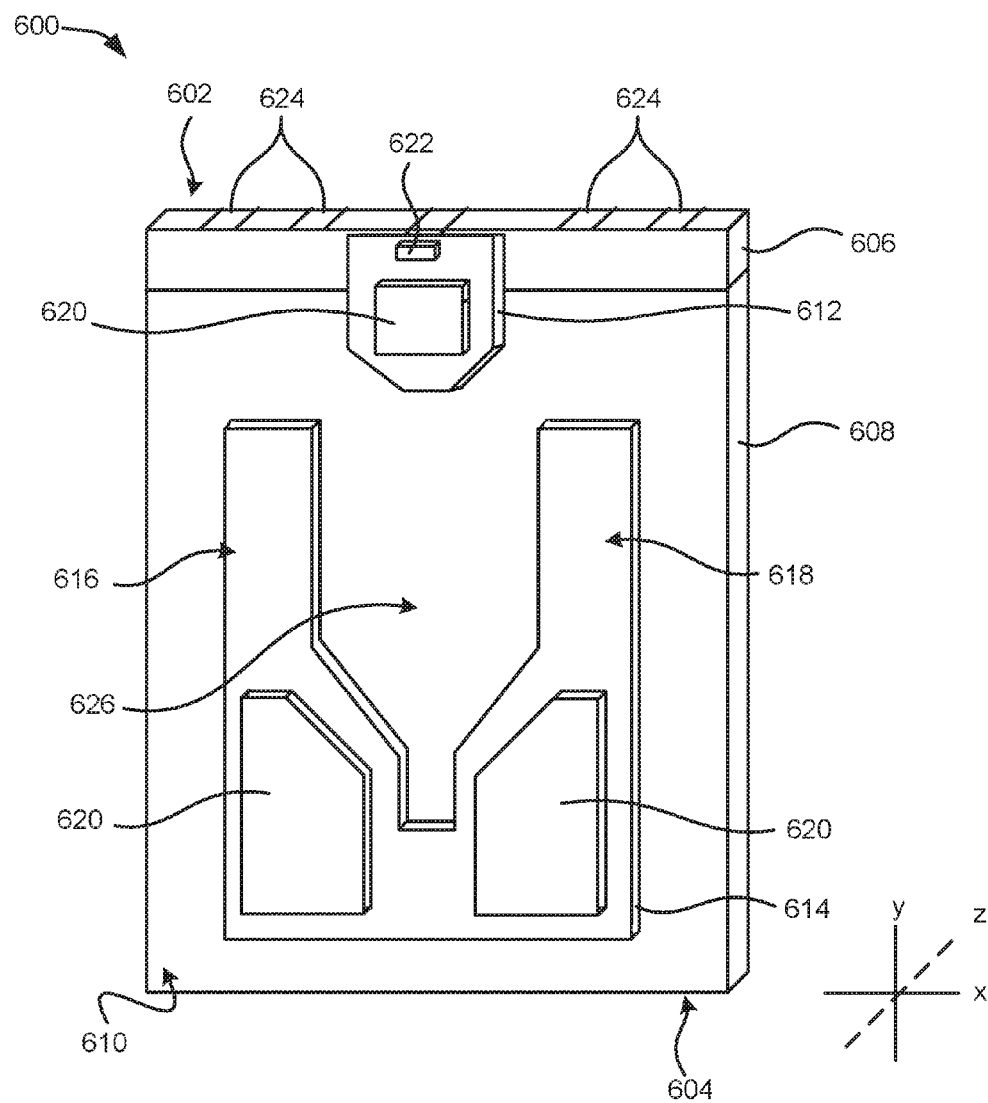
FIG. 6 is a media facing side view of a slider, according to one embodiment.

Referring now to FIG. 6, a media facing side (MFS) view of a slider 600 is shown, according to one embodiment. As an option, the slider 600 may be implemented in conjunction with features from any other embodiment listed herein, such as those described with reference to the other FIGS. Of course, the slider 600 and others presented herein may be used in various applications and/or in permutations, which may or may not be specifically described in the illustrative embodiments listed herein. For instance, the slider 600 may include more or less components than those shown in FIG. 6, in various approaches. Moreover, unless otherwise specified, one or more components of the slider 600 may be of conventional material(s), design, and/or fabricated using conventional techniques, as would become apparent to one skilled in the art upon reading the present disclosure. Further, the slider 600 and others presented herein may be used in any desired environment.

As shown in FIG. 6, the slider 600 has a trailing edge 602, and a leading edge 604. The slider also includes a first region 606 near the trailing edge 602, and a second region 608 extending between the first region 606 and the leading edge 604. The slider 600 additionally includes a media facing side (MFS) 610 extending between the trailing and leading edges 602, 604, and which faces a magnetic medium (not shown in FIG. 6).

In various approaches, the first region 606 and the second region 608 of the slider 600 may each include a ceramic material. In some approaches, the first and second regions 606, 608 may include different materials. In more approaches, the first region 606 may have an etch rate that is different than the etch rate of the second region 608. In particular approaches, the first region 606 may include primarily $Al_2O_3$, and the second region 608 may include primarily $Al_2O_3$—TiC.

As also shown in FIG. 6, the slider 600 includes a center rail 612 and a rear rail 614. The center rail 612 is located near the trailing edge 602, and spans both the first and second regions 606, 608 of the slider 600. The rear rail 614 is located in the second region 608 of the slider 600, and between the center rail 612 and the leading edge 604. The rear rail 614 may comprise side rails 616, 618, which may or may not be physically connected to each other. One or more landing pads 620 may be located on the media facing side of the center and rear rails 612, 614.

The center rail 612 and the rear rail 614 preferably protrude from the MFS 610 of the slider 600 in a direction normal to the MFS 610 of the slider 600. As the center and rear rails 612, 614 protrude from the slider 600, the areas 626 of the slider 600 located between the center rail 612 and the rear rail 614, between the side rails 616, 618, etc. may form one or more negative-pressure surfaces.

In some approaches, the uppermost surface (i.e., the surface closest to the magnetic medium) of the media facing side of the center rail 612 may lie substantially along a plane oriented parallel to the x-y plane of FIG. 6. In more approaches the uppermost surface of the media facing side of the rear rail 614 may lie substantially along a plane oriented parallel to the x-y plane of FIG. 6. In various approaches, one or more portions of the uppermost surface of the center rail 612 and one or more portions of the uppermost surface of the rear rail 614 may lie in substantially the same plane oriented parallel to the x-y plane of FIG. 6.

In additional approaches, the uppermost surface of the media facing side of at least one landing pad 620 may lie substantially along a plane oriented parallel to the x-y plane of FIG. 6. In further approaches, the uppermost surface of the media facing side of each landing pad 620 may lie in substantially the same plane oriented parallel to the x-y plane of FIG. 6.

In various approaches, the center rail 612 may comprise a ceramic material. In some approaches, one or more portions of the center rail 612 (e.g., the portions of the center rail 612 positioned in the second region 608 of the slider 600) may comprise primarily $Al_2O_3$—TiC. In more approaches, one or more portions of the center rail 612 (e.g., the portions of the center rail 612 positioned in the first region 606 of the slider 600) may comprise primarily $Al_2O_3$. In yet more approaches, one or more portions of the rear rail 614 may comprise primarily $Al_2O_3$—TiC.

As further shown in FIG. 6, the slider 600 also includes a magnetic head assembly 622 located at or near the trailing edge 604. The magnetic head assembly 622 includes read and write heads, such as those depicted in FIGS. 2A/2B and 3A/3B. The slider 600 of FIG. 6 further includes one or more conductive terminals 624 configured to connect to at least the read and write heads in the magnetic head assembly 622. The one or more conductive terminals 624 may comprise gold, silver, copper, platinum, or any other suitable material as would become apparent to one of skill in the art upon reading the present disclosure.

While not shown in FIG. 6, a protective overcoat may be deposited on one or more portions of the slider 600. This may be a thin primary overcoat (also referred to herein as a media facing side overcoat (MFSOC) when applied to the media facing side of a slider or magnetic head). The overcoat may include but is not limited to diamond like carbon, that may be deposited, for example, on one or more portions of the MFS 610 of the slider 600. For instance, the MFSOC may be deposited on one or more portions of the media facing side of the center rail 612, one or more portions of the media facing side of the rear rail 614, etc.

Sliders, such as those shown in FIG. 6, may be formed according to the following processes. Of course, more or less manufacturing steps may be used in forming said sliders, as would be apparent to one of skill in the art upon reading the present disclosure.

In various approaches, sliders may be built in wafer form, in which a plurality of magnetic head assemblies (each of which comprises read and write elements) are formed on the surface of a ceramic wafer using thin film processing techniques (e.g., plating, sputtering, chemical vapor deposition, etc.). The wafer may preferably be formed of a ceramic composite material comprising $Al_2O_3$—TiC, as well as trace amounts of other materials, such as MgO. The magnetic head assemblies on the wafer may be encased in a film comprising, e.g., alumina or other such suitable material as would become apparent to one having skill in the art upon reading the present disclosure.

After formation of the magnetic head assemblies is complete, the wafer may be cut into sections (e.g., quadrants). Each section may then be subject to a lapping process to dimension the magnetic head assemblies therein. After lapping, single rowbars of sliders (each slider comprising a magnetic head assembly) are cut from the wafer quads. Each rowbar may be subject to an optional fine lapping process and/or cleaning process.

A thin primary overcoat ("a media facing side overcoat," "MFSOC") may be deposited on the MFS of each slider in a rowbar. In various approaches, the MFSOC may comprise diamond like carbon (DLC) or other suitable material as would become apparent to one having ordinary skill in the art upon reading the present disclosure.

A rail etching process may next be implemented to form a rail pattern including center and side rails, as well as other additional raised features, in the MFS of each slider in a rowbar. This rail etching process may utilize known lithographic and etching techniques. For instance, in some approaches, these raised features may be formed by coating the MFS of each slider with a thick layer of protective photoresist, imaging the photoresist with radiation to form a desired pattern, and transferring (e.g., via ion milling) the desired pattern into the body of the MFS of the slider. After one or more raised rail features have been formed, the remaining photoresist may be removed, such as by a chemical liftoff process utilizing a solvent. Each row bar may then be subsequently diced into individual sliders, each having a magnetic head assembly terminating at the MFS thereof.

As noted above, each slider in a rowbar may comprise a ceramic wafer, a magnetic head assembly formed on the ceramic wafer, and a film encasing/encapsulating the magnetic head assembly. In some approaches, the ceramic wafer and the film encasing the magnetic head assembly may comprise different materials that exhibit different etch rates. For example, in one particular approach, the ceramic wafer may comprise primarily $Al_2O_3$—TiC, and the film encasing the magnetic head assembly may comprise primarily alumina ($Al_2O_3$). An alumina film may exhibit a faster etch rate than a $Al_2O_3$—TiC wafer, thus, the initial lapping process may result in the areas of the slider comprising the alumina film being etched/recessed to a greater extent than those areas of the slider comprising the $Al_2O_3$—TiC wafer.

In preferred approaches, the topography (e.g., the roughness) of at least one side of the $Al_2O_3$—TiC wafer may be varied so as to improve the adhesion of a protective overcoat thereto, as well as to improve flight characteristics of the slider. For example, after the initial lapping process and prior to deposition of the MFSOC, each slider in a rowbar may be subject to an ion beam etching process to vary the topography of at least the media facing side of the $Al_2O_3$—TiC wafer. For instance, an ion beam etching process using an inert gas (e.g., argon) as the ion source may be used in one approach. In such an approach, energetic, highly directional argon ions may be delivered as a high-density beam at various incidence angle(s) to the $Al_2O_3$—TiC wafer, thereby producing anisotropic etch profiles in said wafer due to the differential etch rates of the $Al_2O_3$—TiC composition. However, it is important to note that implementing such an ion beam etching process using solely an inert gas (e.g., argon) as the ion source may also undesirably increase the etch depth of the alumina film and the sensor profile encased/encapsulated therein.

Various exemplary embodiments described herein overcome the aforementioned drawbacks by implementing a novel surface treatment of magnetic recording head slider for improving the wear robustness thereof. In preferred embodiments, this novel surface treatment may increase surface roughness of an $Al_2O_3$—TiC wafer, while maintaining a desired profile of a magnetic head assembly encased/encapsulated within an alumina film. In particular embodiments, this novel surface treatment may include oxygen assisted ion beam etching.

Figure 7A:
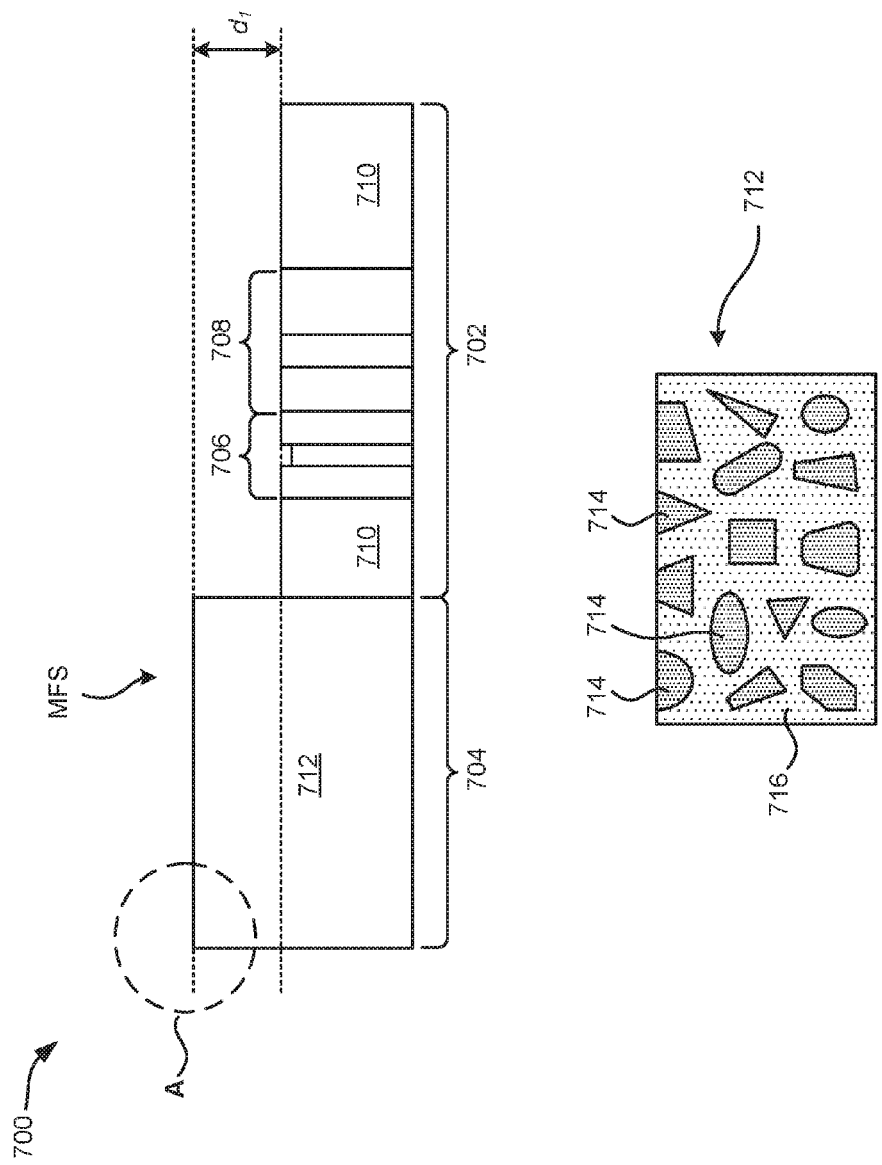

Referring now to FIGS. 7A-7C, a novel surface treatment method for improving head wear robustness is shown according to one embodiment. In particular, FIGS. 7A-7C provide simplified schematic representations of a slider 700 in various stages of formation to best illustrate the aforementioned novel surface treatment.

As an option, this surface treatment method may be implemented to construct structures such as those shown in the other figures. Of course, the present surface treatment method and others presented herein may be used to form magnetic structures for a wide variety of devices and/or purposes which may or may not be related to magnetic recording. It should be noted that any aforementioned features may be used in any of the embodiments described in accordance with the various methods. It should also be noted that the present surface treatment method may include more or less processes than those described and/or illustrated in FIGS. 7A-7C, according to various approaches. Further, the present surface treatment method and others presented herein may be carried out in any desired environment. For instance, in preferred approaches, one or more of the processes described and/or illustrated in FIGS. 7A-7C may be implemented under vacuum.

FIG. 7A illustrates a portion of a slider 700 after implementation of an initial recession/lapping process. The slider 700 includes a first region 702 and a second region 704. The first region 702 may encompass/encapsulate a magnetic head assembly having a read element 706 and a write element 708. As would become apparent to one having skill in the art upon reading the present disclose, the read element may include various components, including, but not limited to, side shields, a read sensor disposed between the side shields, etc. Similarly, the write element 708 may include various components including, but not limited to, a main pole, a return pole, a write coil, etc.

As also shown in the embodiment of FIG. 7A, the first region 702 may include a ceramic material 710, and the second region 704 may include a composite ceramic material 712. In various approaches, the ceramic material 710 may include an oxide. As used herein, an oxide may refer to a chemical compound comprising oxygen and at least one other element. A suitable ceramic material 710 for the first region 702 of the slider 700 may include, but is not limited to, $Al_2O_3$.

An exploded view (taken from circle A) of the composite ceramic material 712 of the second region 704 is further shown in the embodiment of FIG. 7A. The composite ceramic material 712 may comprise a plurality of particles 714 disposed within/throughout a ceramic matrix material 716. In some approaches, the particles 714 may include a semi-metallic or metallic material. In preferred approaches, the particles 714 may not include an oxide, whereas the ceramic matrix material 716 preferably includes an oxide. In more approaches, the particles may be present in the second region 704 in an amount ranging from about 30 wt % to about 50 wt %. In one particular approach, the particles 714 may each include TiC, and the ceramic matrix material 716 may include $Al_2O_3$.

As additionally shown in the embodiment of FIG. 7A, after the initial recession/lapping process, the upper surface of the first region 702 may be recessed relative to the upper surface of the second region 704, where the distance between the upper surfaces of the first and second regions 702, 704 is designated $d_1$. In various approaches, $d_1$ may be in a range from about 0.0 nm to about 0.8 nm.

After the initial recession/lapping process, a first ion beam etching (IBE) process may then be implemented to increase the roughness of the media facing side (also referred to as the upper surface) of the second region 704 by oxidizing portions of the particles 714 disposed at and/or near the media facing side of the second region 704. In preferred approaches, the first IBE etching process may utilize an inert gas (such as Ar) in combination with an oxidizing gas (such as $O_2$) as the source of the etching ions. Accordingly, in such preferred approaches, the IBE etching process may utilize an ion beam comprising an inert species (derived from the inert gas) and an oxidizing species (derived from the oxidizing gas). In particular approaches, the IBE etching process may utilize a first ion beam derived form an $ArO_2$ source, and which comprises oxygen ions as the oxidizing species and argon ions as the inert species.

FIG. 7B illustrates a portion of the slider 700 after implementation of this first IBE process. As shown in FIG. 7B, portions 718 of the particles 714 at and/or near the upper surface of the second region 704 may be oxidized due to exposure to the oxidizing species in the first ion beam during the first IBE process. An exploded view (taken from circle A) of the composite ceramic material 712 of the second region 704 is also shown in FIG. 7B for clarity. The ceramic matrix material 716 of the second region 704 preferably includes an oxide, thus the exposed portions of the ceramic matrix material 716 at and/or near the upper surface of the second region 704 are not oxidized by the oxidizing species in the first ion beam. Accordingly, as the oxidized portions 718 of the particles protrude above the upper surface of the ceramic matrix material 716, the surface roughness of said second region 704 is increased. In an exemplary approach, the particles 714 disposed within/throughout the interior of the second region 704 may comprise TiC, the particles 714 oxidized at and/or the near upper surface of the second region 704 may comprise TiC and $Ti_xO_y$, and the ceramic matrix material 716 may comprise $Al_2O_3$.

In preferred approaches, the surface roughness (Ra) of the second region 704 may be in a range from about 0.5 nm to about 0.7 nm after implementation of the first IBE process. In some approaches, one or more parameters associated with the first IBE process may be varied so as to achieve a desired surface roughness of the second region 704. Such parameters may include, but are not limited to, the amount of the oxidizing species present in the first ion beam, the angle(s) of incidence of the first ion beam relative to the media facing side of the slider 700, the etching duration, the etching rate of the material(s) associated with the slider 700, etc. For instance, increasing the amount of the oxidizing species in the first ion beam may increase the amount of oxidization of the particles 714 at and/or near the upper surface of the second region 704, and thus increase the surface roughness of said second region 704. In particular approaches, the amount of the oxidizing species (e.g., oxygen ions) in the ion beam may be in a range from about 28% to about 35%, and the amount of the inert species (e.g., argon ions) in the ion beam may be in a range from about 65% to about 72%. In more approaches, the first IBE process may utilize an angle of incidence ranging from about 0 degrees to about 55 degrees, with a 0 degree incidence angle being preferable to maximize surface roughness. In yet more approaches, the etching duration of the first IBE process may depend on the etching rate tool performance, and may be controlled by a desired amount of metal (e.g., Ni) removal (as measured in Å) from the read and/or write elements 706, 708. In some approaches, the etching duration of the first IBE process may be selected such that the metal (e.g., Ni) removal is in a range from about 5 Å to about 20 Å, with a preferred metal (e.g., Ni) removal of 5 Å±2.5 Å.

It is also of note that the metal materials present in one or more components of the read element 706 and one or more components of the write element 708 of the magnetic head assembly may be oxidized by the oxidizing species in the first ion beam during the first IBE process. The ceramic material 710 of the first region 702 preferably includes an oxide, thus the exposed portions of the ceramic material 710 at and/or near the upper surface of the first region 702 are not oxidized by the oxidizing species in the first ion beam. As shown in the embodiment of FIG. 7B, oxidized portions 720 of the read and write elements 706, 708 may thus protrude above the upper surface of the ceramic material 710. It is important to note that while the components of the read and write elements 706, 708 are shown protruding about a same amount above the upper surface of the ceramic material 710, this may not be the case in various approaches. For instance, as certain components of the read element 706 (e.g., the shields) and certain components of the write element 708 (e.g., the return pole) may comprise different metallic materials (and/or different concentrations of particular metal species), these components may be oxidized (and thus protrude above the upper surface of the ceramic material 710) to different extents. In one exemplary approach, the return pole of the write element 708 may protrude about 0.4 nm above the upper surface of the ceramic material 710, whereas the shields of the read element 706 may protrude about 0.6 nm above the upper surface of the ceramic material 710. In some approaches, the particular metals and/or concentrations thereof in one or more components of the read element 706 and/or one or more components of the write element 708 may be selected so as to achieve a desired degree of oxidization. For instance, certain metals such as iron and manganese may oxidize easily as compared to other metals such as nickel. Accordingly, the amount of iron, manganese, nickel, etc. in one or more components of the read element 706 and/or one or more components of the write element 708 may be varied to achieve a desired amount of oxidation and thus a desired amount of protrusion above the upper surface of the ceramic material 710.

After implementation of the first IBE process to increase the surface roughness of the second region 704 and/or the magnetic head assembly, a second IBE process may be implemented to achieve a desired surface profile of the magnetic head slider (and particularly the magnetic head assembly). In various approaches, the second IBE process may etch one or more portions of the non-oxidized portions and/or the oxidized portions of the particles 714, one or more portions of the ceramic matrix material 716 of the second region 704, one or more portions of the ceramic material 710 of the first region 702, one or more portions of the oxidized portions and/or non-oxidized portions of the read element 706, and/or one or more portions of the oxidized portions and/or non-oxidized portions of the write element 708.

In preferred approaches, the second IBE process may solely utilize an inert gas (such as argon) as the source of the etching ions. Stated another way, the second IBE process may preferably utilize a second ion beam that includes only an inert species (derived from the inert gas), and does not include any oxidizing species (as utilized in the first IBE process).

FIG. 7C illustrates a portion of the slider 700 after implementation of the second IBE process. As particularly shown in the illustrative (and non-limiting) embodiment of FIG. 7C, the second IBE processes preferably removes the entirety of the oxidized portions 718 of the particles 714 at and/or near the upper surface of the second region 704, as well as the entirety of the oxidized portions 720 of the read and write elements 706, 708. The second IBE process may also remove one or more portions of the non-oxidized portions of the particles 714 at and/or near the upper surface of the second region 704, and/or one or more portions of the non-oxidized portions of the read and write elements 706, 708. As also shown in FIG. 7C, the second IBE process may further remove one or more portions of the ceramic matrix material 716 of the second region 704, and one or more portions of the ceramic material 710 of the first region 702. Depending on the desired level of recession, one or more portions of the non-oxidized particles 714 disposed within/throughout the interior of the second region 704 may also be removed via the second IBE process.

In some approaches, a desired level of recession achieved via the second IBE process may be based, at least in part on, a desired recession of the shields of the read element 706 relative to the upper surface of the second region 704. For instance, in one approach, after implementation of the second IBE process, the upper surface of the shields of the read element 706 may be recessed 1.6 nm±0.2 nm relative to the upper surface of the second region 704. Moreover, after implementation of the second IBE process, the upper surface of the return pole of the write element 708 may be recessed 0.9 nm±0.2 nm relative to the upper surface of the second region 704.

In various approaches, one or more parameters associated with the second IBE process may be varied, where such parameters may include, but are not limited to, the angle(s) of incidence of the second ion beam relative to the media facing side of the slider 700, the etching duration, the etching rate of the material(s) associated with the slider 700, etc. In some approaches, the second IBE process may utilize one or more angles of incidence ranging from about 62 degrees to about 68 degrees, with a preferred 65 degree angle of incidence. In more approaches, the etching duration of the second IBE process may again depend on the etching rate tool performance, and may be controlled by a desired amount of metal (e.g., Ni) removal (as measured in Å) from the read and/or write elements 706, 708. In some approaches, the etching duration of the second IBE process may be selected such that the metal (e.g., Ni) removal is 35 Å±6 Å

While note shown in FIGS. 7A-7C, after implementation of the second IBE process, a protective overcoat may be applied to the media facing side of the slider 700. The combination of the surface roughness of the second region 704 and the recession profile of the first region 702 (and particularly that of the magnetic head assembly encased/encapsulated therein) allows this media facing side protective overcoat (MFSOC) to fill in and better adhere to the slider 700, thus improving wear robustness. In preferred approaches, the MFSOC may include diamond like carbon. An adhesion layer (e.g., SiN) may optionally be deposited on the media facing side of the slider 700 prior to deposition of the MFSOC, in some approaches.

Figure 8:
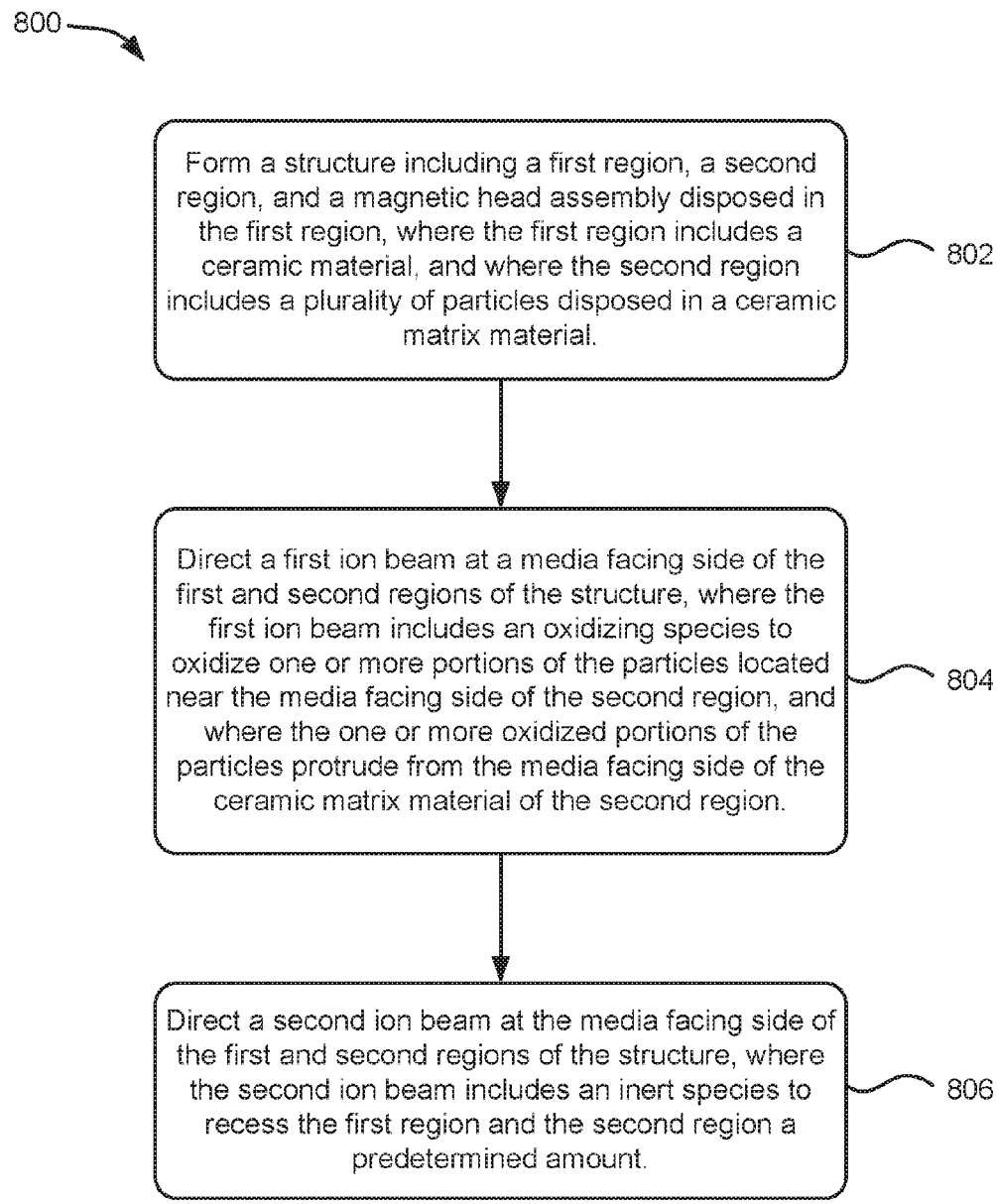
FIG. 8 is a flowchart of a method for implementing a surface treatment to improve head wear robustness, according to one embodiment.

Referring now to FIG. 8, a flowchart of a method 800 for implementing a surface treatment to improve wear robustness of a magnetic head is shown, according to one embodiment. As an option, the method 800 may be implemented to construct structures such as those shown in the other figures. Of course, the method 800 and others presented herein may be used to form magnetic structures for a wide variety of devices and/or purposes which may or may not be related to magnetic recording. It should be noted that any aforementioned features may be used in any of the embodiments described in accordance with the various methods. It should also be noted that the present method may include more or less processes than those described and/or illustrated in FIG. 8, according to various approaches. Further, the present method and others presented herein may be carried out in any desired environment. For instance, in preferred approaches, one or more of the processes described and/or illustrated in FIG. 8 may be implemented under vacuum.

As shown in FIG. 8, the method 800 includes forming a structure (e.g. a magnetic head slider) that includes a first region, a second region, and a magnetic head assembly disposed in the first region, where the first region includes a ceramic material, and the second region includes a plurality of particles disposed in a ceramic matrix material. See operation 802.

In various approaches, the ceramic material of the first region may include one or more oxides. For example, in one preferred approach, the first region may include alumina.

In more approaches, the ceramic matrix material of the second region may include one or more oxides, whereas the particles disposed therein may not include any oxides. In one exemplary approach, the ceramic matrix material of the second region may include alumina, and the particles disposed therein may include titanium carbide (TiC).

After formation of the structure, the media facing side of said structure may be lapped and/or cleaned, according to some approaches. Implementation of such a lapping and/or cleaning process may result in the recession of the media facing side (the upper surface) of the first region relative to the media facing side (the upper surface) of the second region.

As also shown in FIG. 8, after formation of the structure (and/or implementation of the aforementioned lapping/cleaning process), the method 800 includes directing a first ion beam at the media facing side of the first and second regions of the structure. See operation 804. This first ion beam includes at least one oxidizing species configured to oxidize one or more portions of the particles located near the media facing side of the second region. Moreover, as the ceramic matrix material of the second region preferably includes one or more oxides, said oxide ceramic matrix material may not be oxidized from exposure to the oxidizing species in the first ion beam. Thus, after the bombardment by the first ion beam, the one or more oxidized portions of the particles may preferably protrude from the media facing side of the ceramic matrix material of the second region, thereby increasing the surface roughness of the second region. In preferred approaches, the surface roughness of the second region, after exposure to the first ion beam, may be in a range from about 0.5 nm to about 0.7 nm.

Furthermore, the ceramic material of the first region may also preferably include one or more oxides. Accordingly, such an oxide ceramic material may also not be oxidized from exposure to the oxidizing species in the first ion beam. Conversely, one or more portions of the magnetic head assembly in the first region, such as portions of the magnetic head assembly comprising metallic elements (e.g., Fe, Mn, etc.), may be oxidized from exposure to the oxidizing species in the first ion beam. Consequently, after the bombardment by the first ion beam, the one or more oxidized portions of the magnetic head assembly may preferably protrude from the media facing side of the ceramic material of the first region.

In various approaches, the first ion beam may also include an inert species in combination with the oxidizing species. In one particular approach, the first ion beam may be derived from an $ArO_2$ source, thus resulting in oxygen ions as the oxidizing species and argon ions as the inert species.

As discussed previously, one or more parameters associated with first ion beam may be varied to achieve a desired degree of oxidation of the particles of the first region and/or the magnetic head assembly of the second region. For instance, the amount of the oxidizing species relative to an inert species in the first ion beam may be increased so as to increase the degree of oxidation of the particles of the first region and/or the magnetic head assembly of the second region. In various approaches, the amount of the oxidizing species in the first ion beam may be in a range from about 28% to about 35%.

As additionally shown in FIG. 8, the method 800 includes directing a second ion beam at the media facing side of the first and second regions of the structure to recess the first and second regions a predetermined amount. See operation 806. The second ion beam preferably includes an inert species (such as argon ions), but no oxidizing species.

In various approaches, the second ion beam may etch the oxidized portions of the particles of the second region and of the magnetic head assembly, one or more portions of the non-oxidized portions of the particles of the second region and of the magnetic head assembly, one or more portions of the ceramic matrix material of the second region, and/or one or more portions of the ceramic material of the first region.

While not shown in FIG. 8, the method 800 may further include depositing a protective overcoat on the media facing side of the resulting structure after bombardment by the second ion beam. In exemplary approaches, this protective overcoat may include diamond like carbon. An optional adhesion layer (e.g., including SiN) may also be deposited between the media facing side of the structure and the protective overcoat in an optional approach. Deposition of the protective overcoat and optional adhesion layer may be achieved via one or more of: chemical vapor deposition, atomic layer deposition, an ion beam evaporation method, a laser abrasion evaporation method, and arc-discharge technique, or other techniques as would become apparent to one having skill in the art upon reading the present disclosure.

It is of note that the surface roughness and recessed profile of the structure achieved via the bombardment by at least the first ion beam may improve the adherence of the protective overcoat to the structure (e.g., as compared to a structure only exposed to an ion beam comprising an inert species), and thus lead to improved wear robustness of the structure.

It should be noted that methodology presented herein for at least some of the various embodiments may be implemented, in whole or in part, in computer hardware, software, by hand, using specialty equipment, etc. and combinations thereof. Moreover, any of the structures and/or processes may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    forming a structure comprising:
        a first region comprising a ceramic material,
        a second region comprising a plurality of particles disposed in a ceramic matrix material, and
        a magnetic head assembly disposed in the first region; and
    directing a first ion beam at a side of the first and second regions of the structure, wherein the first ion beam comprises an oxidizing species to oxidize one or more portions of the plurality of particles located near the side of the second region, wherein the one or more portions of the plurality of particles that are oxidized protrude from the side of the ceramic matrix material of the second region; and
    directing a second ion beam at the side of the first and second regions of the structure, wherein the second ion beam comprises an inert species to recess the first region and the second region by a predetermined amount.

2. The method as recited in claim 1, wherein the side of the first and second regions of the structure is a media facing side.

3. The method as recited in claim 1, wherein the ceramic material of the first region comprises one or more oxides.

4. The method as recited in claim 3, wherein the ceramic material of the first region comprises alumina.

5. The method as recited in claim 1, wherein the ceramic matrix material of the second region comprises one or more oxides, and wherein the particles of the second region do not include an oxide.

6. The method as recited in claim 5, wherein the ceramic matrix material of the second region comprises alumina, and wherein the plurality of particles of the second region each comprise titanium carbide.

7. The method as recited in claim 1, wherein the ceramic material of the first region and the ceramic matrix material of the second region are not oxidized from exposure to the oxidizing species in the first ion beam.

8. The method as recited in claim 2, further comprising depositing a protective overcoat on the media facing side of the structure after directing the second ion beam at the media facing side thereof.

9. The method as recited in claim 8, wherein an adhesive layer is deposited between the media facing side of the structure and the protective overcoat.

10. The method as recited in claim 1, wherein the oxidizing species comprises oxygen ions.

11. The method as recited in claim 1, wherein the first ion beam comprises an inert species in combination with the oxidizing species.

12. The method as recited in claim 11, wherein the oxidizing species is present in the first ion beam in an amount ranging from about 28% to about 35%.

13. The method as recited in claim 1, wherein the second ion beam does not comprise an oxidizing species.

14. The method as recited in claim 1, wherein the inert species comprises argon ions, and the oxidizing species comprises oxygen ions.

15. The method as recited in claim 1, wherein after directing the first ion beam to the side of the structure, the side of the second region has a surface roughness in a range from about 0.5 nm to about 0.7 nm.

16. The method as recited in claim 1, wherein one or more portions of the magnetic head assembly located near the side of the first region are oxidized from exposure to the oxidizing species in the first ion beam, wherein the one or more portions of the magnetic head assembly that are oxidized protrude from the side of the ceramic material of the first region.

17. The method as recited in claim 1, further comprising lapping the side of the structure prior to directing the first and second ion beams at the side of the structure, wherein after the lapping, the side of the first region is recessed relative to the side of the second region.

18. The method as recited in claim 1, wherein directing the second ion beam at the side of the structure removes all oxidized portions of the plurality of particles and the magnetic head assembly.

* * * * *